US012679263B2

(12) United States Patent
Jeong

(10) Patent No.: US 12,679,263 B2
(45) Date of Patent: Jul. 14, 2026

(54) POWERED HEAD RESTRAINT

(71) Applicant: WOOBO TECH CO., LTD.,
Pyeongtaek-si (KR)

(72) Inventor: Hae Il Jeong, Incheon (KR)

(73) Assignee: WOOBO TECH CO., LTD.,
Pyeongtaek-si (KR)

( * ) Notice: Subject to any disclaimer, the term of this
patent is extended or adjusted under 35
U.S.C. 154(b) by 161 days.

(21) Appl. No.: 18/838,184

(22) PCT Filed: Sep. 23, 2022

(86) PCT No.: PCT/KR2022/014232
§ 371 (c)(1),
(2) Date: Aug. 13, 2024

(87) PCT Pub. No.: WO2023/158045
PCT Pub. Date: Aug. 24, 2023

(65) Prior Publication Data
US 2025/0145070 A1 May 8, 2025

(30) Foreign Application Priority Data
Feb. 18, 2022 (KR) ........................ 10-2022-0021258

(51) Int. Cl.
B60N 2/58 (2006.01)
B60N 2/829 (2018.01)
(Continued)

(52) U.S. Cl.
CPC ............. B60N 2/865 (2018.02); B60N 2/829
(2018.02); *B60N 2/815* (2018.02)

(58) Field of Classification Search
CPC .. A47C 7/38; A47C 1/10; A47C 16/00; A47C
31/105; A47C 7/727; B60N 2/865;
(Continued)

(56) References Cited

U.S. PATENT DOCUMENTS 4,762,367 A * 8/1988 Denton .................. B60N 2/838
297/391
6,550,856 B1 * 4/2003 Ganser .................. B60N 2/686
297/216.12
(Continued)

FOREIGN PATENT DOCUMENTS

KR 10-2008-0079950 A 9/2008
KR 10-2012-0038607 A 4/2012
(Continued)

OTHER PUBLICATIONS

International Searching Authority/KR, International Search Report
and Written Opinion of the International Searching Authority,
Application No. PCT/KR2022/014232, dated Jan. 18, 2023, 7 pages
Office, Notice of Allowance, Application No. 10-2022-0021258,
dated.
(Continued)

*Primary Examiner* — Shin H Kim
(74) *Attorney, Agent, or Firm* — Merchant & Gould P.C.

(57) ABSTRACT
The present disclosure relates to a powered head restraint for
vehicle seat back. In particular, the present disclosure relates
to a powered articulated head restraint for vehicle seat back
moving back and forth without a combination of guide pins
and guide holes or a combination of guide pins and guide
long holes.

13 Claims, 7 Drawing Sheets

(51) Int. Cl.
  *B60N 2/865* (2018.01)
  *B60N 2/815* (2018.01)

(58) Field of Classification Search
  CPC .......... B60N 2/829; B60N 2/80; B60N 2/806;
    B60N 2/832; B60N 2/868; B60N 2/838
  See application file for complete search history.

(56) References Cited

U.S. PATENT DOCUMENTS

| | | | | |
|---|---|---|---|---|
| 7,517,015 | B2 * | 4/2009 | Terada .................. | B60N 2/888 |
| | | | | 297/216.12 |
| 9,950,652 | B2 * | 4/2018 | Line ..................... | B60N 2/6009 |
| 10,099,592 | B2 * | 10/2018 | Line ....................... | B60N 2/865 |
| 10,144,322 | B2 * | 12/2018 | Line ..................... | B60N 2/6009 |
| 10,703,237 | B2 * | 7/2020 | Line ....................... | B60N 2/862 |
| 12,508,965 | B2 * | 12/2025 | Yu .......................... | B60N 2/829 |
| 2010/0127548 | A1 * | 5/2010 | Truckenbrodt ........ | B60N 2/865 |
| | | | | 297/391 |
| 2010/0314918 | A1 * | 12/2010 | Alexander ............. | B60N 2/862 |
| | | | | 297/216.12 |
| 2017/0313217 | A1 * | 11/2017 | Line ..................... | B60N 2/6009 |
| 2017/0313218 | A1 * | 11/2017 | Line ....................... | B60N 2/865 |
| 2017/0313219 | A1 * | 11/2017 | Line .................... | B60N 2/6009 |
| 2017/0313220 | A1 * | 11/2017 | Line .................... | B60N 2/6009 |
| 2019/0047452 | A1 * | 2/2019 | Line ....................... | B60N 2/865 |

FOREIGN PATENT DOCUMENTS

| | | |
|---|---|---|
| KR | 10-1553527 B1 | 9/2015 |
| KR | 10-1601535 B1 | 3/2016 |
| KR | 10-1736831 B1 | 5/2017 |
| KR | 10-1784153 B1 | 10/2017 |
| KR | 10-1878280 B1 | 7/2018 |
| KR | 10-2442642 B1 | 9/2022 |

OTHER PUBLICATIONS

Korean Intellectual Property 2022-08-04, 7 pages (in Korean).

* cited by examiner

[Fig. 1]
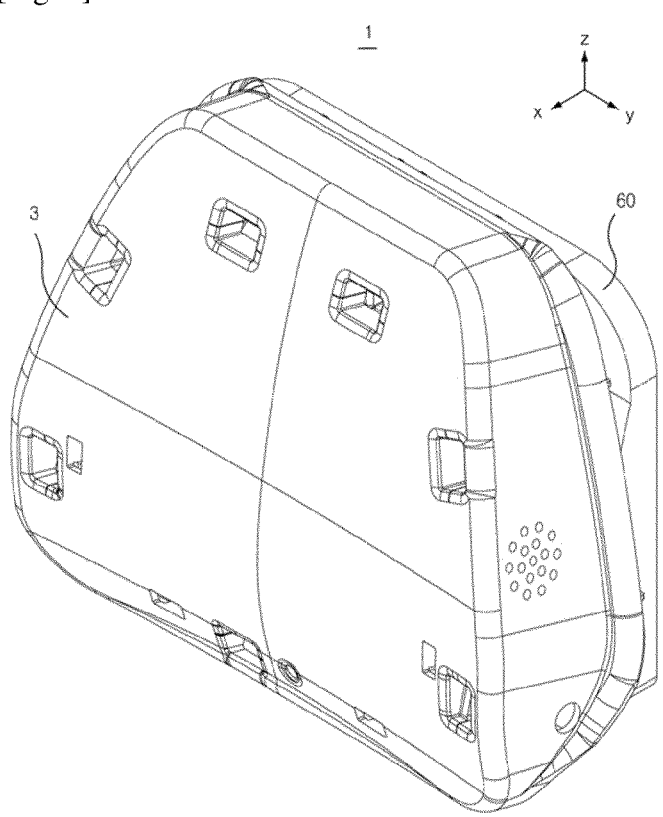
[Fig. 2]
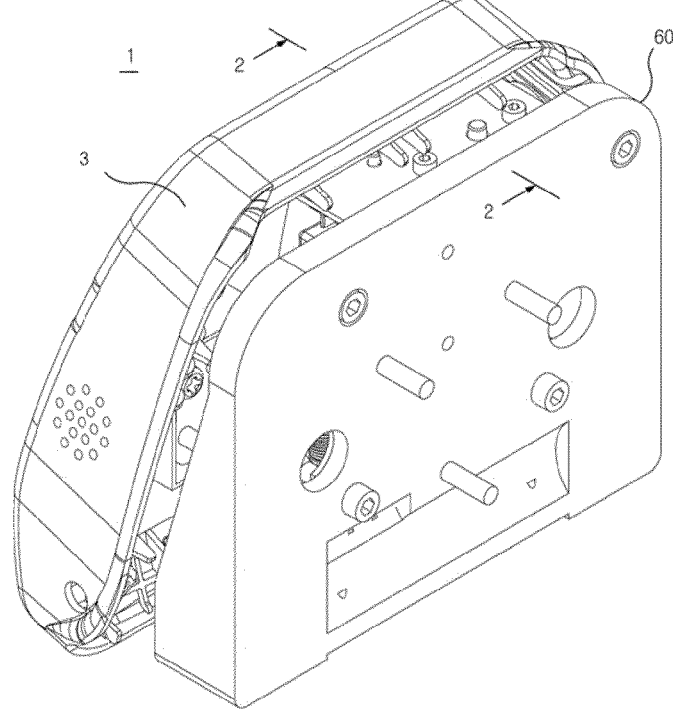

[Fig. 3]
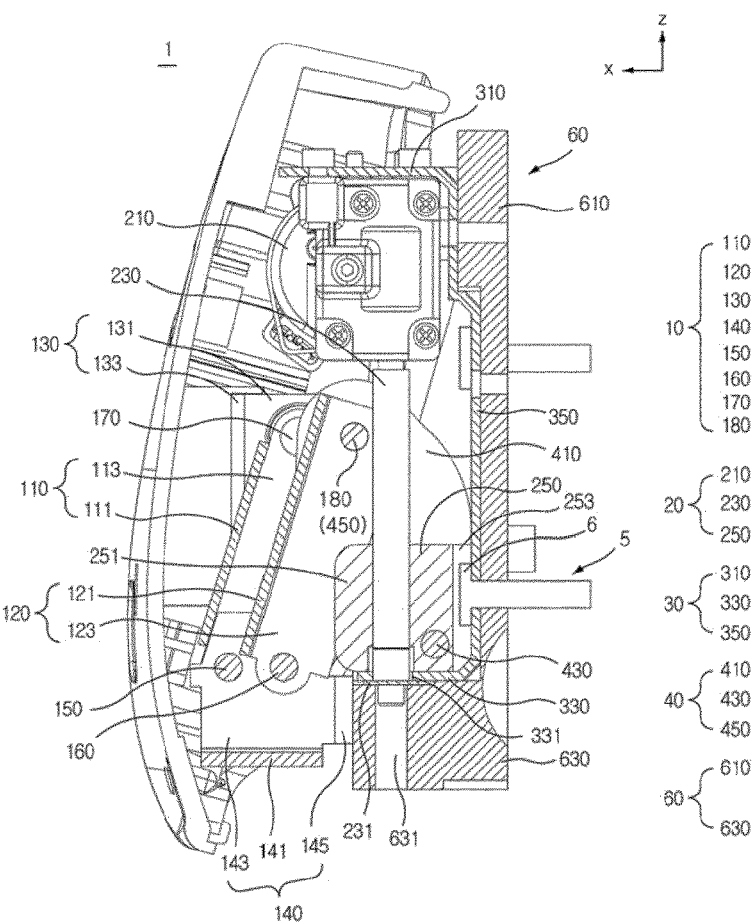
[Fig. 4]
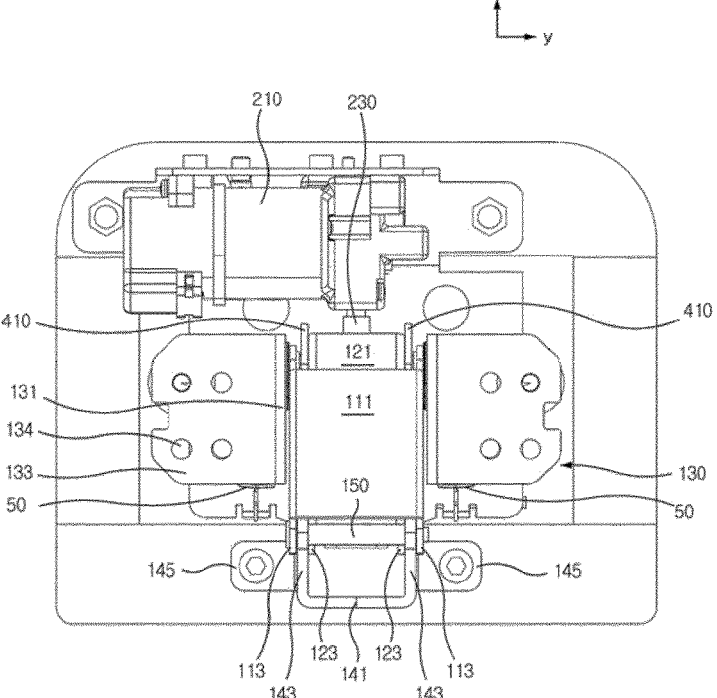

[Fig. 5]

[Fig. 6]
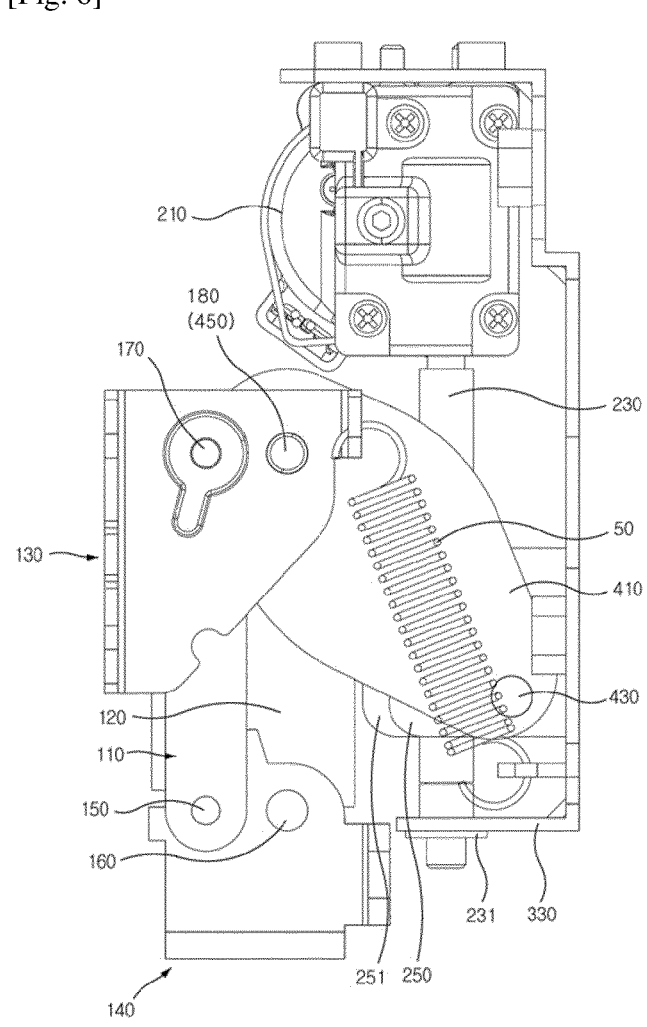

[Fig. 7]
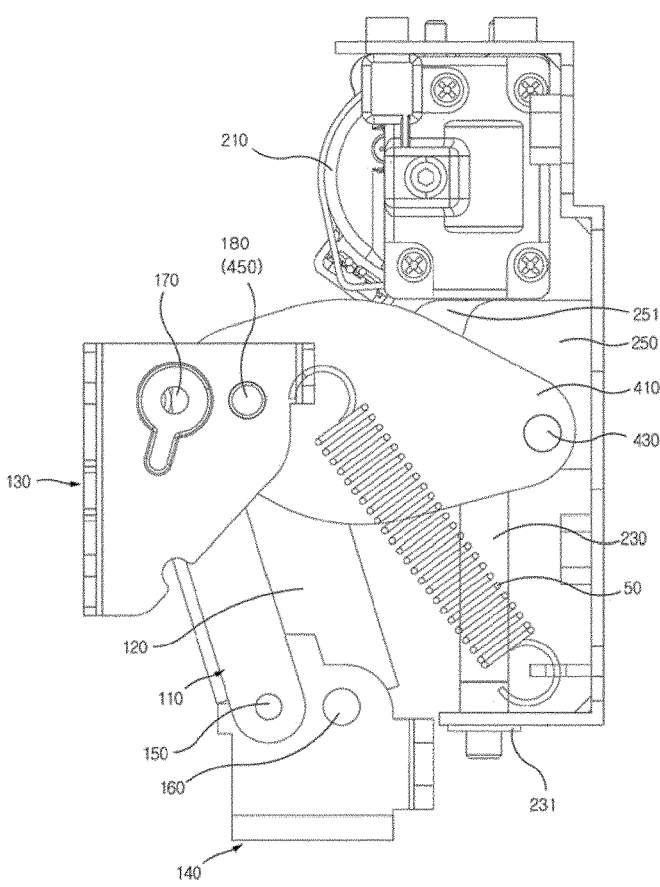
[Fig. 8]
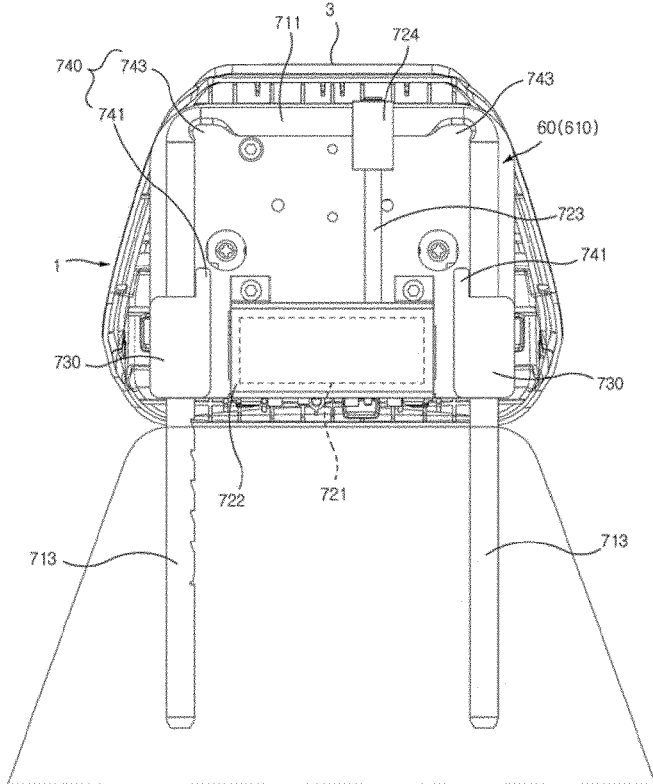

[Fig. 9]
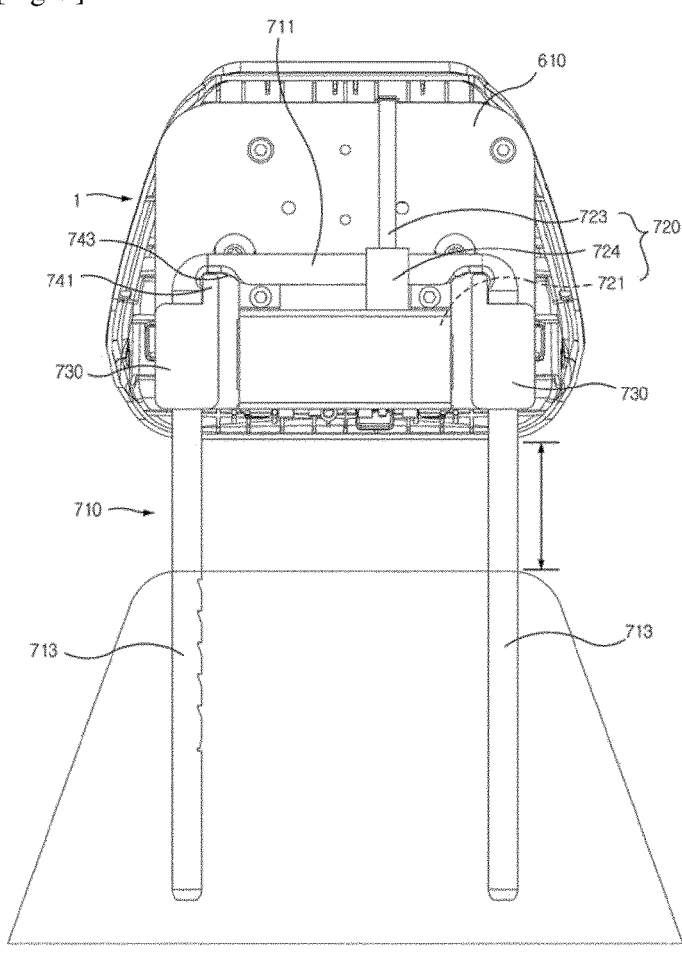
[Fig. 10]
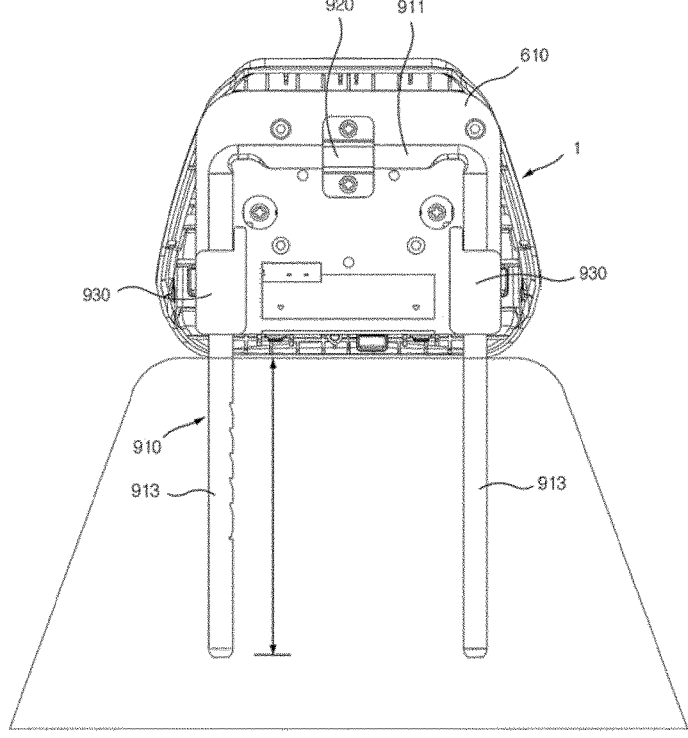

[Fig. 11]
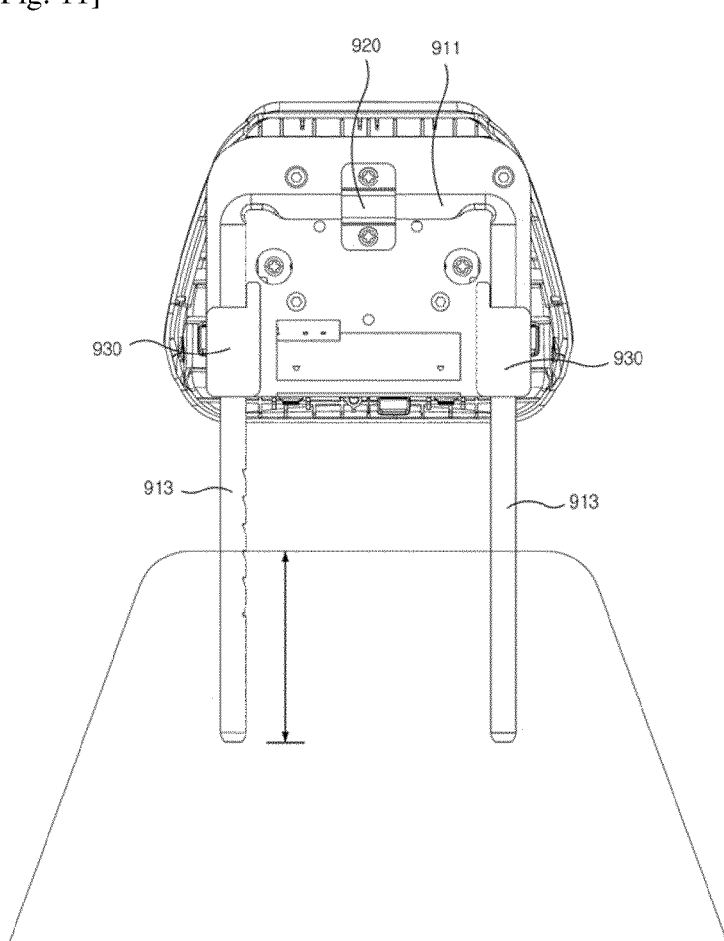

POWERED HEAD RESTRAINT

This application is the national phase entry of international patent application no. PCT/KR2022/014232, filed Sep. 23, 2022 and claims the benefit of Korean patent application No. 10-2022-0021258, filed Feb. 18, 2022, the disclosures of which are incorporated herein by reference in their entirety.

TECHNICAL FIELD

The present disclosure relates to a powered head restraint for vehicle seat back. In particular, the present disclosure relates to a powered articulated head restraint for vehicle seat back moving back and forth without a combination of guide pins and guide holes or a combination of guide pins and guide long holes.

BACKGROUND ART

A trend of automobiles is to electrify and adjust a seat according to a body type of a driver. According to this trend, a head restraint is also electrified to provide the convenience of simultaneously adjusting the seat and the head restraint according to a desired position of the driver.

A powered head restraint disclosed in a related art patent document (Korean Patent No. 10-1736831) can move back and forth through a combination of long holes and pins.

However, because the long hole surrounds and constrains only ¾ of a diameter of the pin, a gap may occur through ¼ of the pin that is not constrained, causing a vibration and a noise.

A powered head restraint disclosed in another related art patent document (Korean Patent No. 10-1878280) can move back and forth through guide pins moving along guide holes.

However, it is difficult for the guide hole to assemble the guide pin in a correct position due to a manufacturing tolerance (e.g., defective dimension or injection deformation, etc.). Even if the guide pin is correctly assembled in the guide hole, the guide pin is tightly inserted into the guide hole due to the manufacturing tolerance, thereby making it difficult to move. Therefore, if a margin is secured by modifying the tolerance to the extent that the guide pin can move in the guide hole for the purpose of the smooth movement, the guide pin is loosely inserted into the guide hole, and there is no choice but to generate a gap.

Since the guide hole contracts and expands depending on a vehicle temperature, the guide hole may block the forward and backward movement of the guide pin.

Technical Problem

An object of the present disclosure is to address the above-described and other problems.

Another object of the present disclosure is to provide stably and continuously a simple and reliable forward and backward operation of a powered head restraint.

Solution to Problem

In order to achieve the above-described and other objects, in one aspect of the present disclosure, there is provided a powered head restraint comprising a front-back moving unit, a motor, a lead screw installed on the motor, a lifting nut fastened to the lead screw, a guide unit configured to guide a non-rotation lifting of the lifting nut, and a pivot link unit connected to an upper side of the front-back moving unit and the lifting nut.

Advantageous Effects of Invention

Effects of a powered head restraint according to the present disclosure are described as follows.

According to at least one embodiment of the present disclosure, the present disclosure can provide a powered head restraint providing a reliable operation irrespective of influences such as a gap, a product tolerance, and a temperature by connecting a lifting nut fastened to a lead screw and a front-back moving unit to a pivot link unit.

According to at least one embodiment of the present disclosure, the present disclosure can provide a powered head restraint capable of removing more reliably a gap of shafts or pins of a front-back moving unit and a pivot link unit by installing a tension spring pulling the front-back moving unit to a guide unit.

According to at least one embodiment of the present disclosure, the present disclosure can provide a powered head restraint capable of preventing a rotation of a lifting nut together with a guide unit by disposing a front portion of the lifting nut in an inner space of a front-back moving unit and capable of contributing overall compactness by reducing a front-back width of the head restraint.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

BRIEF DESCRIPTION OF DRAWINGS

FIGS. 1 and 2 are front and rear perspective views illustrating a powered head restraint according to an embodiment of the present disclosure.

FIG. 3 is a cross-sectional view of FIG. 2.

FIG. 4 is a front view in which a cushion cover of FIG. 1 is removed.

FIGS. 5, 6 and 7 are side views illustrating a basic position, an intermediate position, and a final position of a powered head restraint of FIG. 1 that moves forward.

FIGS. 8 and 9 are back views illustrating a basic height and a final height of a powered head restraint of FIG. 1 that is automatically adjusted.

FIGS. 10 and 11 are back views illustrating a basic height and a final height of a powered head restraint of FIG. 1 that is manually adjusted.

MODE FOR THE INVENTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected with other layers, areas, and components intervening between them. For example, when layers, areas, components, etc. are electrically connected, the present disclosure includes both the case where layers, areas, and components are directly electrically connected, and the case where layers, areas, and components are indirectly electrically connected with other layers, areas, and components intervening between them.

Hereinafter, an x-axis is defined as a front-rear direction, y-axis is defined as a left-right direction, and a z-axis is defined as an up-down direction.

Referring to FIGS. 1 to 4, a powered head restraint 1 according to an embodiment of the present disclosure may include a front-back moving unit 10, a driver 20, a guide unit 30 guiding the driver 20, and a pivot link unit 40 operating the front-back moving unit 10 through a drive of the driver 20.

Referring to FIGS. 3 and 4, the powered head restraint 1 according to an embodiment of the present disclosure may include the front-back moving unit 10.

The front-back moving unit 10 may include a front link 110. The front link 110 may be formed by bending in a ⊏-shape. The front link 110 may include a first front link 111. The first front link 111 may form a front plate. The front link 110 may include a second front link 113. The second front link 113 may form a side plate. The second front link 113 may be formed by bending rearward from the left and right sides of the first front link 111.

The front-back moving unit 10 may include a rear link 120. The rear link 120 may be disposed behind the front link 110. The rear link 120 may be formed by bending in a ⊏-shape. The rear link 120 may include a first rear link 121. The first rear link 121 may be a rear front plate. The rear link 120 may include a second rear link 123. The second rear link 123 may be a rear side plate. The second rear link 123 may be formed by bending rearward from the left and right sides of the first rear link 121. The rear link 120 may have a size to be inserted into the front link 110.

Figure 5:
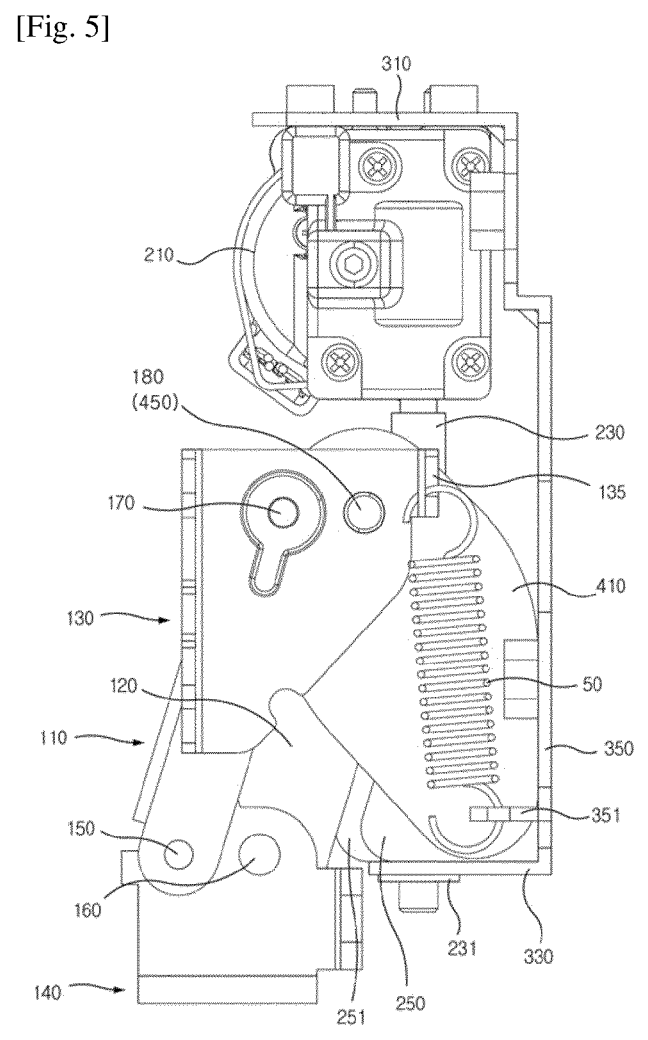

The front-back moving unit 10 may include a head support portion 130. The head support portion 130 may include a 2-bar link 131. The 2-bar link 131 may be disposed outside the second front and rear links 113 and 123. The head support portion 130 may include a head support plate 133. The head support plate 133 may be formed by bending the 2-bar link 131 from the front to the outside of the left and right sides. The head support plate 133 may be formed by bending the 2-bar link 131 by 90 degrees. The head support plate 133 may include a fastening hole 134. The fastening hole 134 may fasten and support the cushion cover 3 using a bolt. Referring to FIG. 5, the head support portion 130 may include an upper sheet piece 135. An upper side of a tension spring 50 of the upper sheet piece 135 may be caught. The upper sheet piece 135 may be comprised of a U-shaped groove. For example, the U-shaped groove may be formed in a plate that bends from a rear end of the 2-bar link 131 to the outside of the left and right sides.

The front-back moving unit 10 may include a base bracket 140. The base bracket 140 may be disposed at a lower side of the front and rear links 110 and 120. The base bracket 140 may include a base lower plate 141. The base bracket 140 may include a base side plate 143. The base side plate 143 may be formed by bending upward from the left and right sides of the base lower plate 141. The base side plate 143 may be disposed between the second front link 113 and the second rear link 123. The base bracket 140 may include a support plate 145. The support plate 145 may be formed by bending from the base side plate 143 to the outside of the left and right sides. The support plate 145 may be formed by bending the base side plate 143 by 90 degrees.

The front-back moving unit 10 may include a lower front rotating shaft 150. The lower front rotating shaft 150 may pivotally support the front link 110 with respect to the base bracket 140. That is, the lower front rotating shaft 150 may connect a lower side of the second front link 113 and an upper side of the base side plate 143.

The front-back moving unit 10 may include a lower rear rotating shaft 160. The lower rear rotating shaft 160 may pivotally support the rear link 120 with respect to the base bracket 140. That is, the lower rear rotating shaft 160 may connect a lower side of the second rear link 123 and the upper side of the base side plate 143.

The front-back moving unit 10 may include an upper front rotating pin 170. The upper front rotating pin 170 may connect the front link 110 and the head support portion 130.

The upper front rotating pin 170 may connect an upper side of the second front link 113 and an upper side of the 2-bar link 131.

The front-back moving unit 10 may include an upper rear rotating shaft 180. The upper rear rotating shaft 180 may connect the rear link 120 and the head support portion 130 to each other. The upper rear rotating shaft 180 may connect an upper side of the second rear link 123 and the upper side of the 2-bar link 131.

Referring to FIG. 3, the powered head restraint 1 according to an embodiment of the present disclosure may include the driver 20.

The driver 20 may include a motor 210. The motor 210 may be disposed on the front-back moving unit 10.

The driver 20 may include a lead screw 230. The lead screw 230 may be installed on a rotating shaft of the motor 210. The lead screw 230 may be vertically disposed downward.

The driver 20 may include a lifting nut 250. The lifting nut 250 may be fastened to the lead screw 230. The lifting nut 250 may move up and down along a rotation axis of the lead screw 230. An outer peripheral surface of the lifting nut 250 may be formed in a rectangular shape. A front portion 251 of the lifting nut 250 may be disposed inside the rear link 120. That is, the front portion 251 of the lifting nut 250 may be disposed between the second rear links 123 at a basic position as illustrated in FIG. 3.

Referring to FIG. 3, the powered head restraint 1 according to an embodiment of the present disclosure may include the guide unit 30. The guide unit 30 may guide non-rotationally the lifting nut 250. The guide unit 30 may have a ⊏-shape.

The guide unit 30 may include an upper mounting plate 310. The upper mounting plate 310 may mount the motor 210.

The guide unit 30 may include a lower mounting plate 330. The lower mounting plate 330 may rotatably mount the lower side of the lead screw 230. The lower mounting plate 330 may include upper and lower through holes 331. The lower side of the lead screw 230 may be inserted into the upper and lower through holes 331. A C-ring 231 caught on a bottom surface of the lower mounting plate 330 may be installed at a lower end of the lead screw 230. The lower mounting plate 330 may be disposed on a line near the lower front and rear rotating shafts 150 and 160.

The guide unit 30 may include a connection mounting plate 350. The connection mounting plate 350 may connect between the rear side of the upper mounting plate 310 and the rear side of the lower mounting plate 330. A front surface of the connection mounting plate 350 may be comprised of a catching surface that holds the lifting nut 250 so the lifting nut 250 is prevented from rotating. Referring to FIG. 5, a lower sheet piece 351 may be formed on the connection mounting plate 350. The lower sheet piece 351 may be caught on the lower side of the tension spring 50. The lower sheet piece 351 may be formed on a plate bent horizontally from a lower end of the connection mounting plate 350.

Referring to FIGS. 3 and 4, the powered head restraint 1 according to an embodiment of the present disclosure may include the pivot link unit 40. Both ends of the pivot link unit 40 may be connected to the upper side of the front-back moving unit 10 and the lifting nut 250. The pivot link unit 40 may move forward the front-back moving unit 10 as the lifting nut 250 rises.

The pivot link unit 40 may include a pivot link 410. The pivot link 410 may be comprised of a rhombic plate. An upper side of the pivot link 410 may be disposed outside the second rear link 123.

The pivot link unit 40 may include a lower link rotating shaft 430. The lower link rotating shaft 430 may connect the lower side of the pivot link 410 and the lifting nut 250. The lower link rotating shaft 430 may be disposed at a position close to a rotation center shaft of the lead screw 230.

The pivot link unit 40 may include an upper link rotating shaft 450. The upper link rotating shaft 450 may connect the upper side of the pivot link 410 and the second rear link 123. The upper link rotating shaft 450 may be formed as the same rotating shaft as the upper rear rotating shaft 180.

Referring to FIGS. 5 to 7, the powered head restraint 1 according to an embodiment of the present disclosure may include the tension spring 50. The tension spring 50 may be installed between the front-back moving unit 10 and the guide unit 30. That is, both sides of the tension spring 50 may be installed on a spring catching piece 135 and a spring catching ring 351.

Referring to FIG. 3, the powered head restraint 1 according to an embodiment of the present disclosure may include a support stand 60. The support stand 60 may support the front-back moving unit 10, the driver 20, and the guide unit 30. The support stand 60 may be fixed to a seat back.

The support stand 60 may include a vertical support stand 610. The vertical support stand 610 may support the connection mounting plate 350. The vertical support stand 610 may fix the connection mounting plate 350 by fastening the bolt and the nut. Further, the vertical support stand 610 and the connection mounting plate 350 may be fixed to the seat back by a seat back mounting bolt 5. A head 6 of the seat back mounting bolt 5 may be disposed on the front surface of the connection mounting plate 350. In this case, a recessed groove 253 may be formed on a rear surface of the lifting nut 250. The recessed groove 253 may allow accommodation and passage of the head 6.

The support stand 60 may include a base support 630. The base support 630 may be comprised of a horizontal support formed at a lower end of the vertical support stand 610. The base support 630 may support the lower mounting plate 330. The base support 630 may support the support plate 145 of the base bracket 140. The base support 630 may include an accommodation hole 631 in which the lower side of the lead screw 230 is accommodated.

The support stan 60 may have a shape surrounding the outer sides of the lower mounting plate 330 and the connection mounting plate 350.

With reference to FIGS. 5 to 7, a front-back operation of the powered head restraint 1 according to an embodiment of the present disclosure is described.

FIG. 5 is a side view illustrating a basic position before the powered head restraint 1 operates. Referring to FIG. 5, the front link 110 and the rear link 120 are disposed at a positive (+) slope, and the pivot link 410 is disposed at a negative (−) slope. The front and rear links 110 and 120 and the pivot link 410 may be disposed in a mountain shape. A bottom lower surface of the lifting nut 250 is placed on the lower mounting plate 330.

FIG. 6 is a side view illustrating an intermediate position at which the powered head restraint 1 operates. Referring to FIG. 6, when the motor 210 rotates the lead screw 230, the lifting nut 250 rises upward along the lead screw 230. The rise of the lifting nut 250 allows the lower link rotating shaft 430 and the lower side of the pivot link 410 to rise. When the lower side of the pivot link 410 rises, the upper side of the pivot link 410 pushes forward the upper side with respect to the lower sides of the front and rear links 110 and 120 while drawing an arc shape. FIG. 6 illustrates a state in which the front and rear links 110 and 120 stand vertically at 90 degrees.

FIG. 7 is a side view illustrating a final position of the powered head restraint 1. Referring to FIG. 7, when the lifting nut 250 is positioned directly below the motor 210, the front and rear links 110 and 120 may be disposed at a negative (−) slope, and the pivot link 410 may be disposed almost horizontally. Then, the head support portion 130 may move forward by approximately 30 mm. The tension spring 50 can remove the gap by pulling the link pin and the link rotating shafts toward the guide unit 30.

FIGS. 8 and 9 are back views illustrating a basic height and a final height of the powered head restraint of FIG. 1 that is automatically adjusted.

Referring to FIGS. 8 and 9, the powered head restraint 1 according to an embodiment of the present disclosure may include a height adjustment unit 70. The height adjustment unit 70 may automatically move a height of the head restraint by about 70 mm.

The height adjustment unit 70 may include a stay 710. The stay 710 may be comprised of a fixed type stay 710 fixed to the seat back. The stay 710 may be comprised of a horizontal bar 711 and left and right vertical bars 713. Lower parts of the left and right vertical bars 713 may be fixed to the inside of the seat back.

The height adjustment unit 70 may include a lifting driver 720. The lifting driver 720 may raise and lower the support stand 60 with respect to the stay 710. The lifting driver 720 may include a lifting motor 721. The lifting motor 721 may be disposed between the left and right vertical bars 713. A motor case 722 may be installed on a rear surface of the vertical support stand 610. The lifting motor 721 may be supported on the motor case 722. The lifting driver 720 may include a lead screw 723. The lead screw 723 may be installed on a rotating shaft of the lifting motor 721. The lifting driver 720 may include a fixing nut 724. The fixing nut 724 may be fastened to the lead screw 723. The fixing nut 724 may be installed on the horizontal bar 711.

The height adjustment unit 70 may include a bush type guide 730. The bush type guide 730 may be slidably fitted to the left and right vertical bars 713. The bush type guide 730 may be formed on the rear surface of the vertical support stand 610.

The height adjustment unit 70 may include a stopper 740. The stopper 740 may include a catching protrusion 741 of the bush type guide 730 and a catching groove 743 of the horizontal bar 711. The catching protrusion 741 may have a shape protruding upward from an upper surface of the bush type guide 730. The catching groove 743 may be formed on a bottom surface of the horizontal bar 711.

FIGS. 10 and 11 are back views illustrating a basic height and a final height of the powered head restraint of FIG. 1 that is manually adjusted.

Referring to FIGS. 10 and 11, the powered head restraint 1 according to an embodiment of the present disclosure may include a height adjustment unit 90. The height adjustment unit 90 may manually move a height of the head restraint by about 70 mm.

The height adjustment unit 90 may include a stay 910. The stay 910 may be comprised of a lifting type stay 910 installed on the seat back. The stay 910 may be comprised of a horizontal bar 911 and left and right vertical bars 913. A height of the left and right vertical bars 913 may be adjusted in a state in which the lock is released by pressing a button of a seat portion, in the same manner as the existing manner.

The height adjustment unit 90 may include a bracket 920. The bracket 920 may fix the stay 910 to the vertical support stand 610. The bracket 920 may be installed on the horizontal bar 911.

The height adjustment unit 90 may include a bush type guide 930. The bush type guide 930 may be fitted to the left and right vertical bars 713. The bush type guide 930 may be formed on the rear surface of the vertical support stand 610. The bush type guide 930 cannot move by a bracket 920. The bracket 920 and the left and right bush type guides 930 are supported in the form of triangular points and thus can stably fix the head restraint 1 to the stay 900.

Some embodiments or other embodiments of the present disclosure described above are not mutually exclusive or distinct from each other. Configurations or functions of some embodiments or other embodiments of the present disclosure described above can be used together or combined with each other.

It is obvious to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

What is claimed is:

1. A powered head restraint comprising:
   a front-back moving unit with a cushion installed on a front surface;
   a driver;
   a guide unit guiding the driver;
   a pivot link unit operating the front-back moving unit through a drive of the driver; and
   a support stand installed on a seat and supports the front-back moving unit, the driver and the guide unit,
   wherein the driver includes;
   a motor;
   a lead screw installed on the motor; and
   a lifting nut fastened to the lead screw,
   wherein the guide unit guides a non-rotation lifting of the lifting nut, and
   the pivot link unit installed between an upper side of the front-back moving unit and the lifting nut,
   wherein the guide unit includes;
   an upper mounting plate configured to mount the motor;
   a lower mounting plate configured to rotatably mount a lower side of the lead screw; and
   a connection mounting plate configured to connect the upper mounting plate and the lower mounting plate,
   wherein a rear surface of the lifting nut is guided along a front surface of the connection mounting plate.

2. The powered head restraint of claim 1, wherein the pivot link unit includes:
   a pivot link disposed to be inclined to a rotation center line of the lead screw;
   a lower link rotating shaft configured to connect a lower side of the pivot link and the lifting nut; and
   an upper link rotating shaft configured to connect an upper side of the pivot link and the front-back moving unit.

3. The powered head restraint of claim 2, wherein the lower link rotating shaft is disposed at a position close to a rotation center shaft of the lead screw.

4. The powered head restraint of claim 1, wherein a support stand is installed on a rear surface of the connection mounting plate, wherein the support stand is fixed to a seat back of the seat.

5. The powered head restraint of claim 4, wherein a seat back mounting bolt is installed on the support stand, wherein a head of the seat back mounting bolt is disposed on the front surface of the connection mounting plate, and wherein a recessed groove preventing an interference with the head is formed in the rear surface of the lifting nut.

6. The powered head restraint of claim 1, wherein a support stand is installed on a rear surface of the connection mounting plate, and wherein a stay coupled to a seat back of the seat is installed on the support stand.

7. The powered head restraint of claim 6, wherein the stay is fixed to the seat back, wherein the powered head restraint further comprises a lifting driver configured to raise and lower the support stand with respect to the stay, and wherein the lifting driver includes:

a lifting motor installed on the support stand;

a lead screw installed on the lifting motor; and a fixing nut installed on a horizontal bar of the stay and fastened to the lead screw.

8. The powered head restraint of claim 7, wherein a bush type guide is installed on the support stand, and wherein the bush type guide is slidably fitted to left and right vertical bars of the stay.

9. The powered head restraint of claim 8, wherein a catching groove is formed in a bottom surface of the horizontal bar, and wherein a catching protrusion caught in the catching groove is formed on the bush type guide.

10. The powered head restraint of claim 1, wherein a tension spring is installed between the front-back moving unit and the guide unit.

11. The powered head restraint of claim 2, wherein the front-back moving unit includes:

a front link and a rear link;

a head support portion with a cushion installed on a front surface;

a base bracket;

a lower front rotating shaft connecting the front link and the base bracket, and a lower rear rotating shaft connecting the rear link and the base bracket; and an upper front rotating pin connecting the front link and the head support portion, and an upper rear rotating shaft connecting the rear link and the head support portion.

12. The powered head restraint of claim 11, wherein the upper rear rotating shaft is the same as the upper link rotating shaft.

13. The powered head restraint of claim 11, wherein the rear link includes:

a front side first rear link plate; and a side second rear link plate protruding rearward from left and right sides of the front side first rear link plate, wherein a front portion of the lifting nut is disposed inside the rear link.

* * * * *